US012662369B1

(12) United States Patent
Hillius

(10) Patent No.: US 12,662,369 B1
(45) Date of Patent: Jun. 23, 2026

(54) BAREBACK RIDING HANDLE DEVICE

(71) Applicant: Joachim Hillius, Chattanooga, TN (US)

(72) Inventor: Joachim Hillius, Chattanooga, TN (US)

( * ) Notice: Subject to any disclaimer, the term of this patent is extended or adjusted under 35 U.S.C. 154(b) by 0 days.

(21) Appl. No.: 19/290,476

(22) Filed: Aug. 5, 2025

(51) Int. Cl.
*B68C 1/00* (2006.01)

(52) U.S. Cl.
CPC .................................... *B68C 1/00* (2013.01)

(58) Field of Classification Search
USPC ............................................. 54/23, 4, 84, 1
See application file for complete search history.

(56) References Cited

U.S. PATENT DOCUMENTS

| | | | | |
|---|---|---|---|---|
| 213,246 A * | 3/1879 | Piersons | B68B 3/00 | 54/1 |
| 1,427,608 A * | 8/1922 | Lotz | A45C 13/22 | 16/406 |
| 1,772,831 A * | 8/1930 | Hastings | B68B 5/00 | 54/54 |
| 3,438,177 A * | 4/1969 | Houston | B68C 1/00 | 54/44.1 |
| 3,734,049 A * | 5/1973 | Humbert | B68C 1/00 | 54/1 |
| 3,872,653 A * | 3/1975 | Thompson | B68C 1/00 | 54/4 |
| 4,165,712 A * | 8/1979 | Crowley, Jr. | A63B 69/0068 | 273/447 |
| 4,506,496 A * | 3/1985 | Olson | B68C 3/00 | 54/46.1 |
| 5,651,240 A * | 7/1997 | Tompkins | B68C 1/02 | 54/44.1 |
| 6,105,345 A * | 8/2000 | Dunton | B68C 1/00 | 54/1 |
| 6,145,478 A * | 11/2000 | Boyd | B68C 1/00 | 54/44.1 |
| 6,298,640 B1 * | 10/2001 | Schneider | B68C 1/00 | 54/23 |
| 6,427,426 B1 * | 8/2002 | Dunton | B68C 1/00 | 54/1 |
| 7,121,068 B2 * | 10/2006 | Van Scoyk | B68C 1/16 | 54/44.1 |
| 7,140,326 B2 * | 11/2006 | Jenny | A01K 27/002 | 119/770 |
| D680,697 S * | 4/2013 | Sandvick | D30/135 | |

(Continued)

FOREIGN PATENT DOCUMENTS

| | | | |
|---|---|---|---|
| FR | 2942988 A3 * | 9/2010 | B25D 3/00 |
| FR | 3050194 A1 * | 10/2017 | B68C 3/00 |

(Continued)

*Primary Examiner* — Morgan T Jordan

(57) ABSTRACT

A bareback riding handle device provides a quick release pivoting handle which is also replaceable when needed. The device includes a base having a bottom surface shaped for conforming to a back of a horse adjacent to a base of a neck of the horse. A handle has a forward end pivotally coupled to the base. The handle is pivotable into a closed position. A handle receiver couples to rigging extending over a portion of the base and strapped onto the horse. The handle is selectively engageable to the handle receiver such that the handle is secured in the closed position. A release mechanism couples the handle to the handle receiver for releasing the handle from the handle receiver such that the handle is free to pivot out of the closed position.

18 Claims, 14 Drawing Sheets

(56) References Cited

U.S. PATENT DOCUMENTS

| | | | | |
|---|---|---|---|---|
| 8,574,087 | B1 * | 11/2013 | Newcombe | A63G 19/20 434/247 |
| 2006/0048318 | A1 * | 3/2006 | Goh | A47L 11/4069 15/228 |
| 2006/0112521 | A1 * | 6/2006 | Moshenrose | B25G 1/06 16/430 |
| 2006/0137300 | A1 * | 6/2006 | Van Scoyk | B68C 1/16 54/44.1 |
| 2006/0168918 | A1 * | 8/2006 | Naslund | B68C 1/16 54/44.1 |
| 2008/0028885 | A1 * | 2/2008 | Monig | E05B 85/16 16/412 |
| 2008/0099350 | A1 * | 5/2008 | Duncan | B68C 1/002 340/568.1 |
| 2009/0283730 | A1 * | 11/2009 | Rice | B25B 25/00 54/1 |
| 2010/0229507 | A1 * | 9/2010 | Strauss | B68C 1/04 54/44.3 |
| 2018/0093880 | A1 * | 4/2018 | McPhaul | B68C 1/025 |

FOREIGN PATENT DOCUMENTS

| | | | | | |
|---|---|---|---|---|---|
| GB | 2571321 | A | * | 8/2019 | B68B 1/00 |
| KR | 20130046050 | A | * | 5/2013 | B68C 1/147 |
| WO | WO-2024152028 | A1 | * | 7/2024 | E04F 21/1652 |

* cited by examiner

BAREBACK RIDING HANDLE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to horse riding handles and more particularly pertains to a new horse riding handle for providing a quick release pivoting handle which is also replaceable when needed.

(2) Description of Related Art Including Information Disclosed Under 37 CFR 1.97 and 1.98

The prior art relates to horse riding handles. Known horse riding handles for bareback riding, particularly for rodeo competitions, lack quick release for extricating a stuck hand, replaceability for the handle from a base structure, and enhanced comfort for the horse.

BRIEF SUMMARY OF THE INVENTION

An embodiment of the disclosure meets the needs presented above by generally comprising a base having a bottom surface shaped for conforming to a back of a horse adjacent to a base of a neck of the horse. A handle has a forward end pivotally coupled to the base. The handle is pivotable into a closed position. A handle receiver couples to rigging extending over a portion of the base and attached to the horse. The handle is selectively engageable to the handle receiver such that the handle is secured in the closed position. A release mechanism couples the handle to the handle receiver for releasing the handle from the handle receiver such that the handle is free to pivot out of the closed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
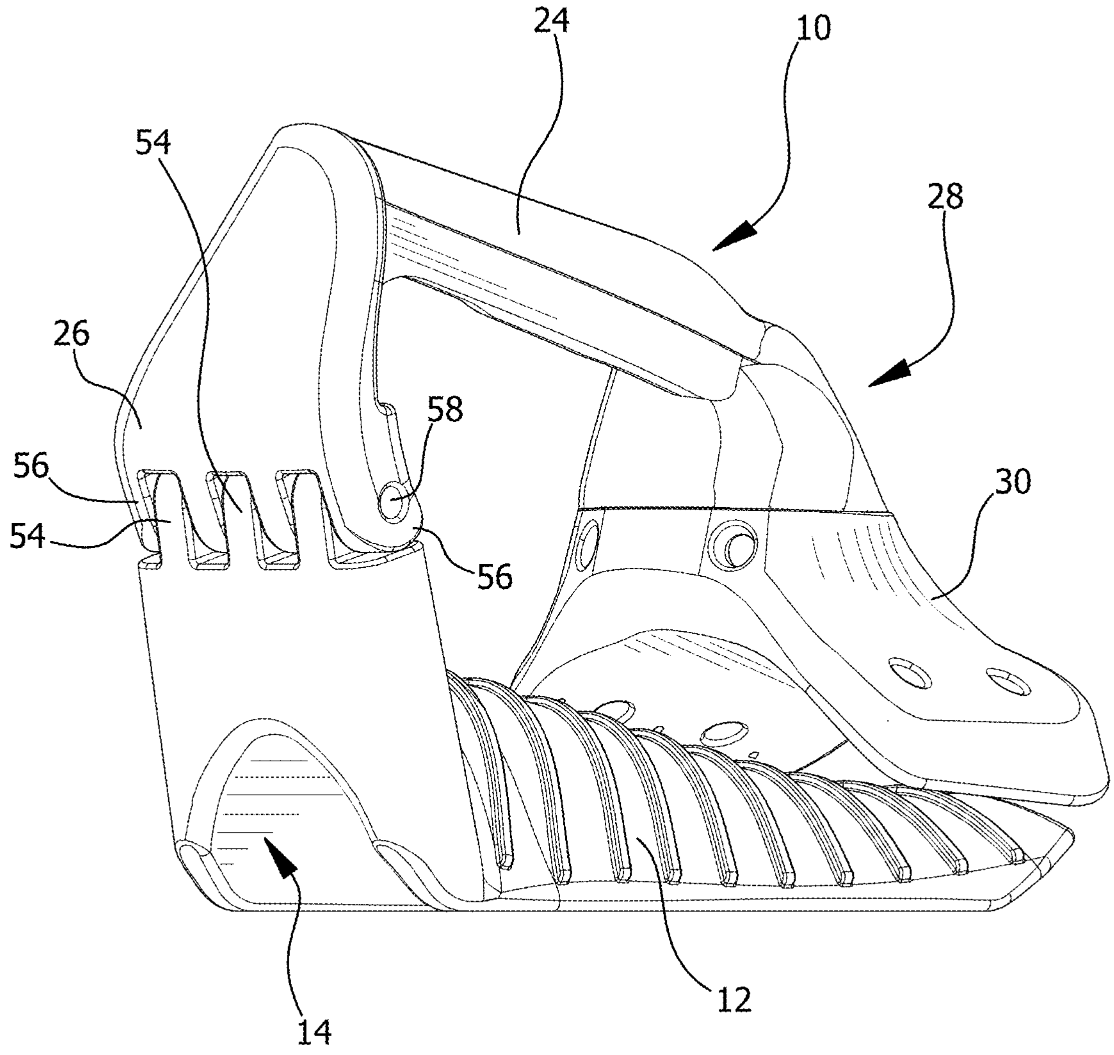
FIG. 1 is a front side perspective view of a bareback riding handle device according to an embodiment of the disclosure.
Figure 2:
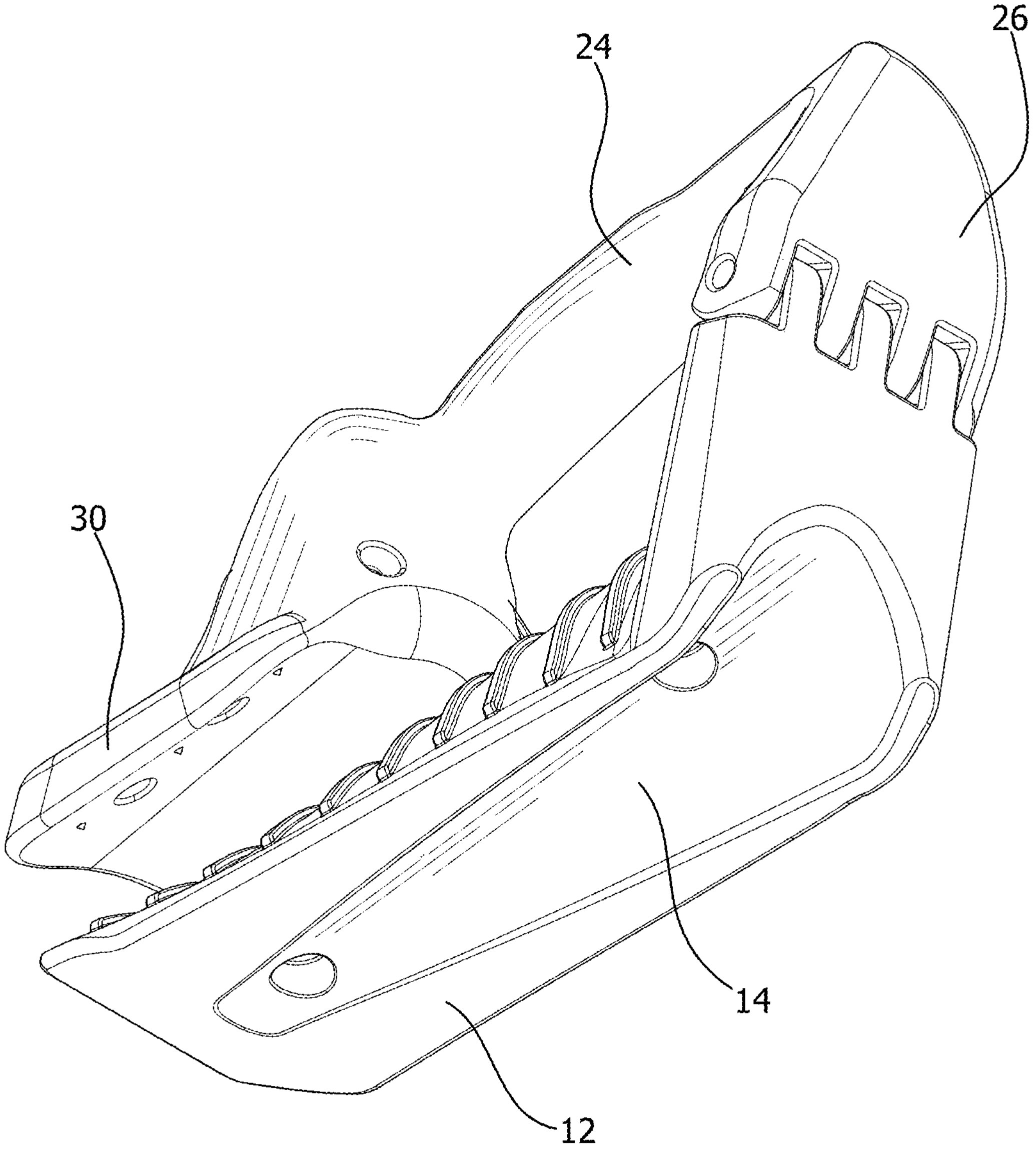
FIG. 2 is a bottom front side perspective view of an embodiment of the disclosure.
Figure 3:
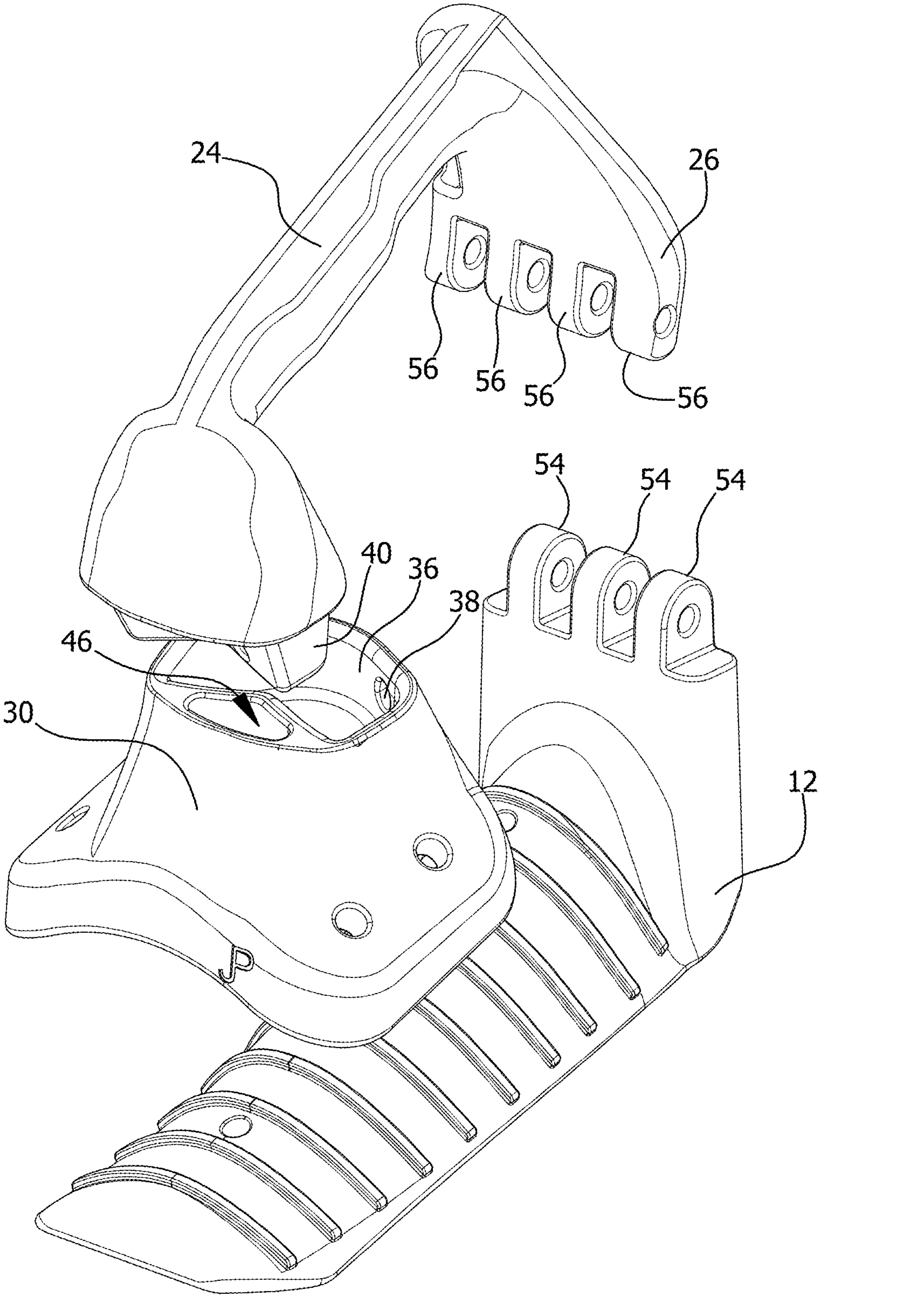
FIG. 3 is an exploded top rear side perspective view of an embodiment of the disclosure.
Figure 4:
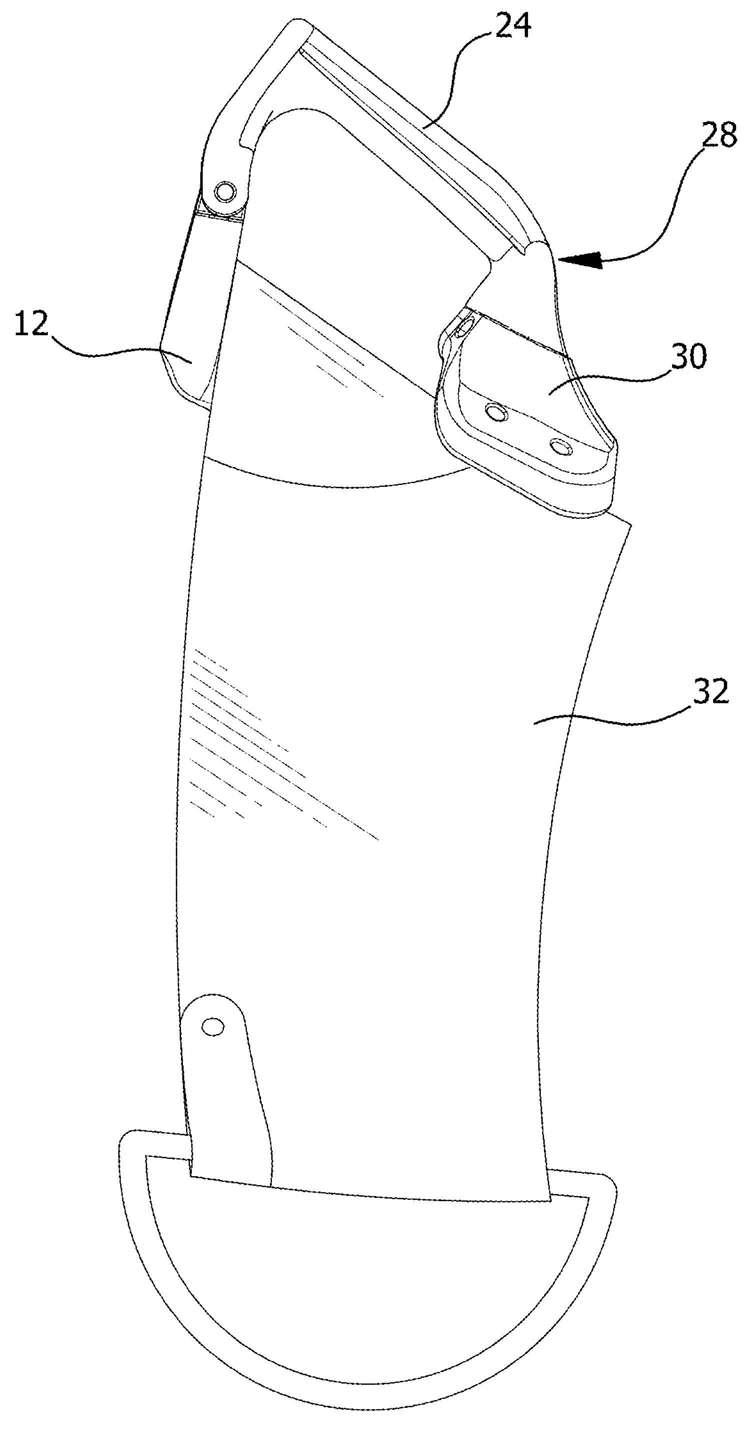
FIG. 4 is a side view of an embodiment of the disclosure attached to rigging.
Figure 5:
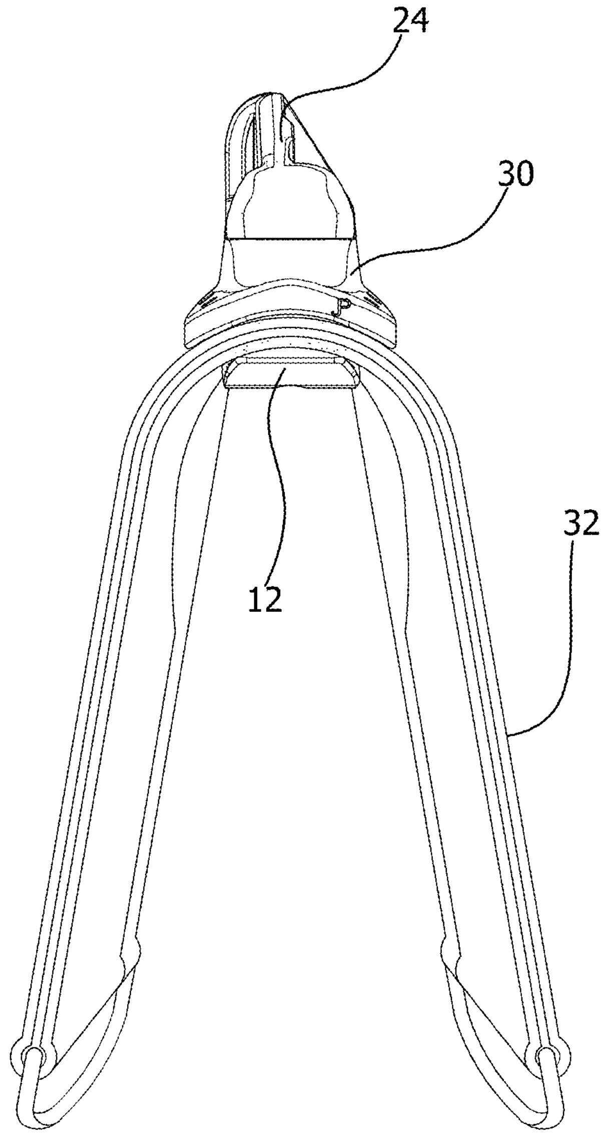
FIG. 5 is a rear view of an embodiment of the disclosure attached to rigging.
Figure 6:
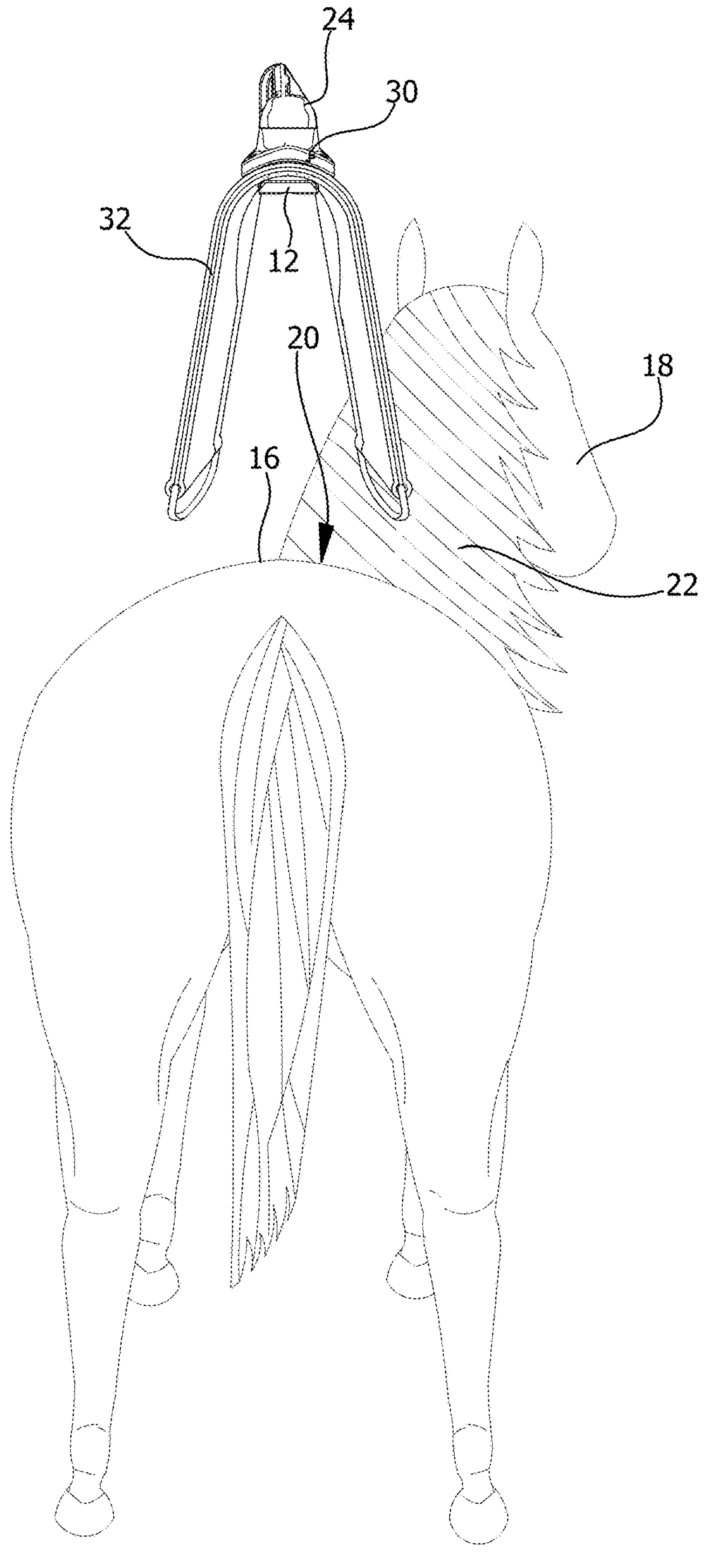
FIG. 6 is a rear view of an embodiment of the disclosure attached to rigging.
Figure 7:
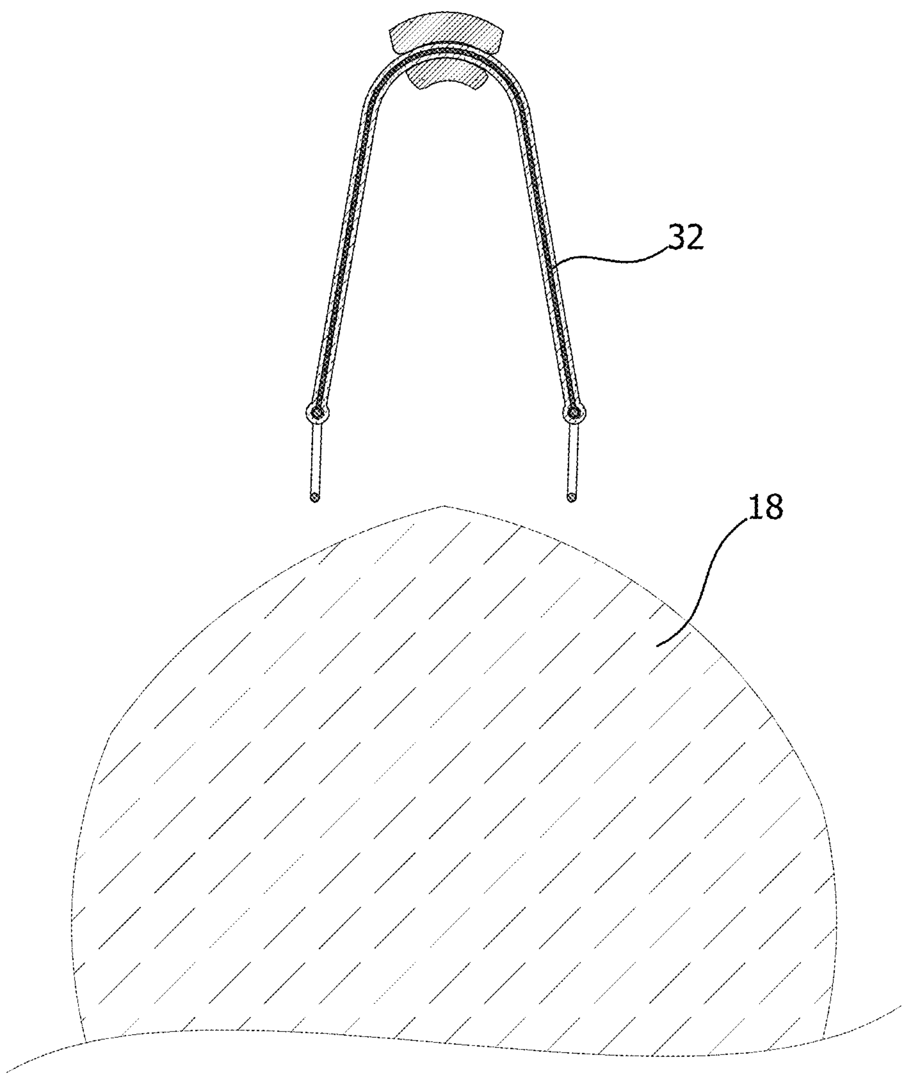
FIG. 7 PRIOR ART
FIG. 7 is a rear view of prior art.
Figure 8:
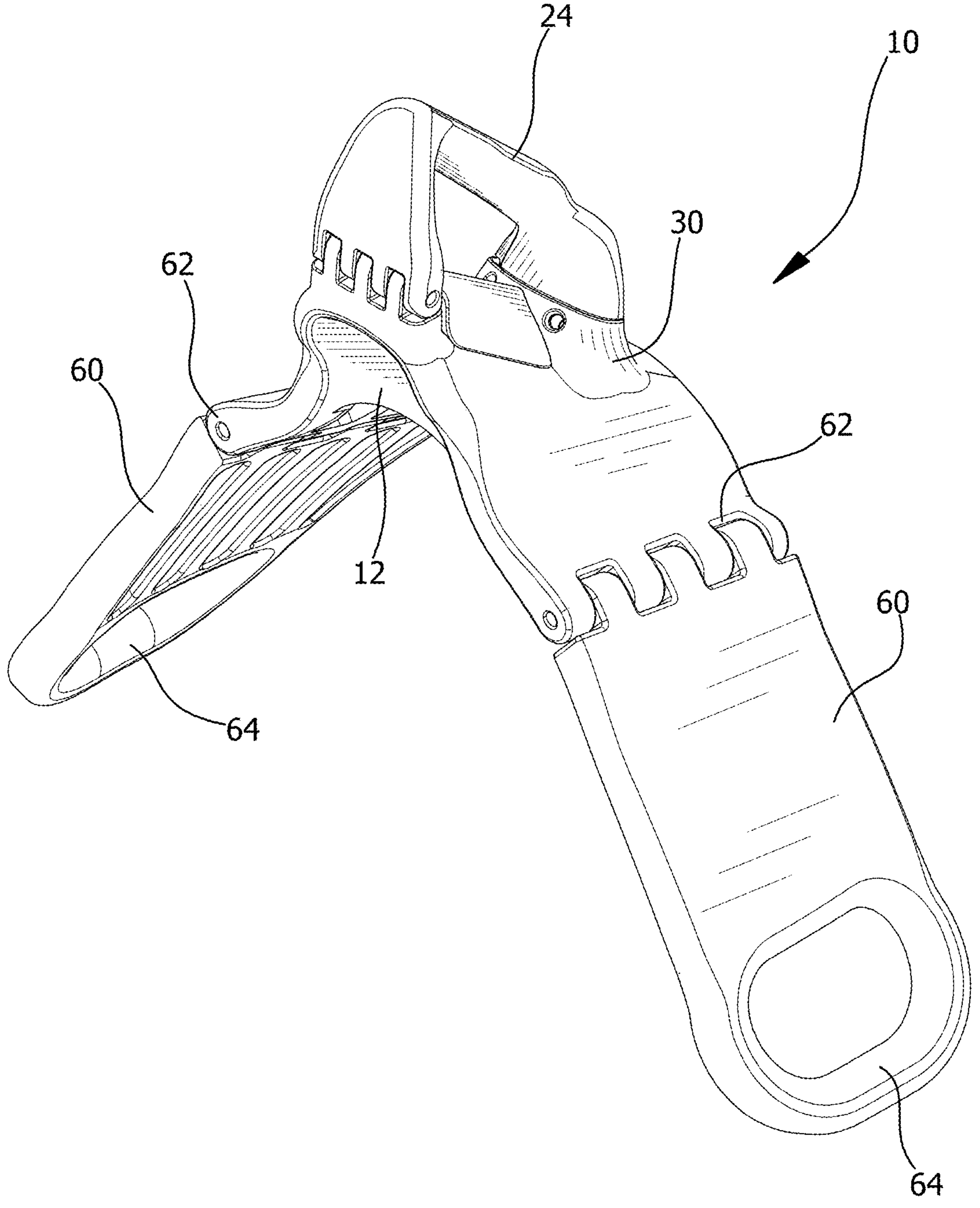
FIG. 8 is a top front side perspective view of an embodiment of the disclosure.
Figure 9:
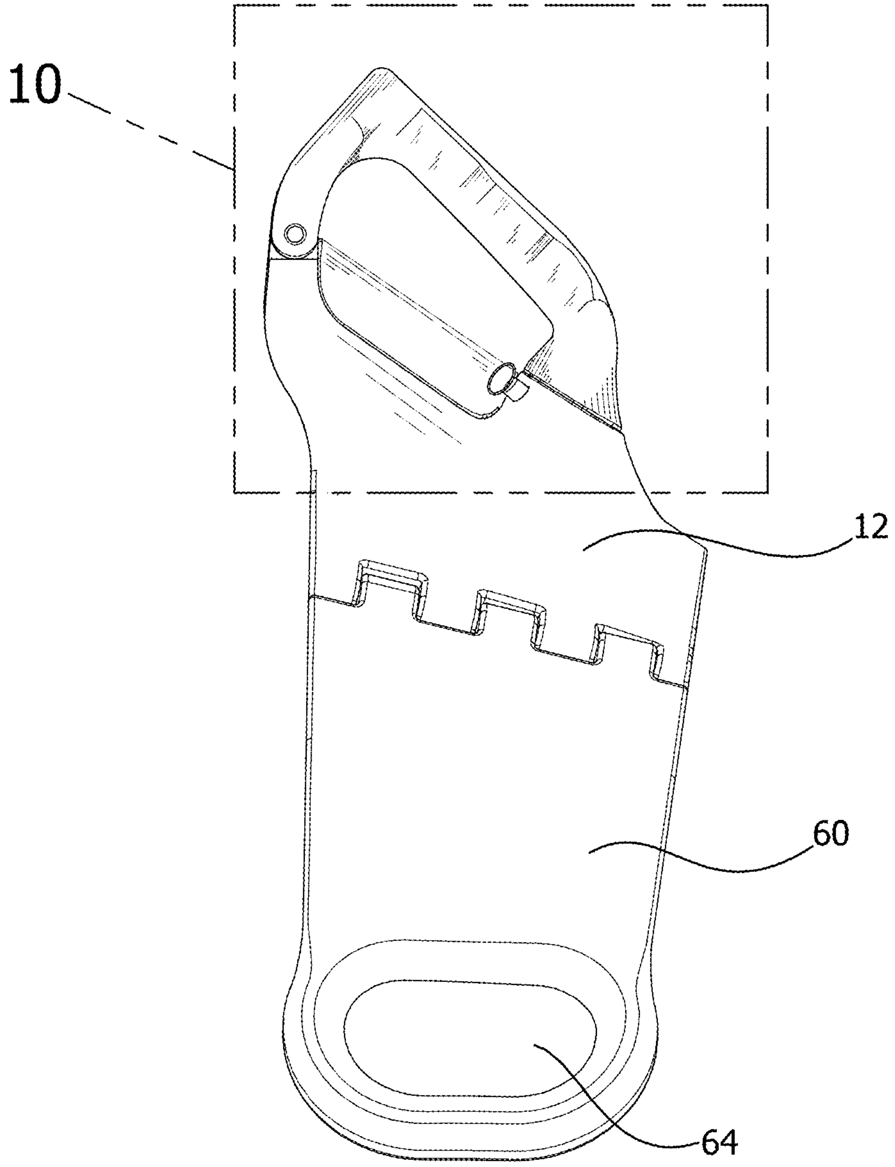
FIG. 9 is a side view of an embodiment of the disclosure.
Figure 10:
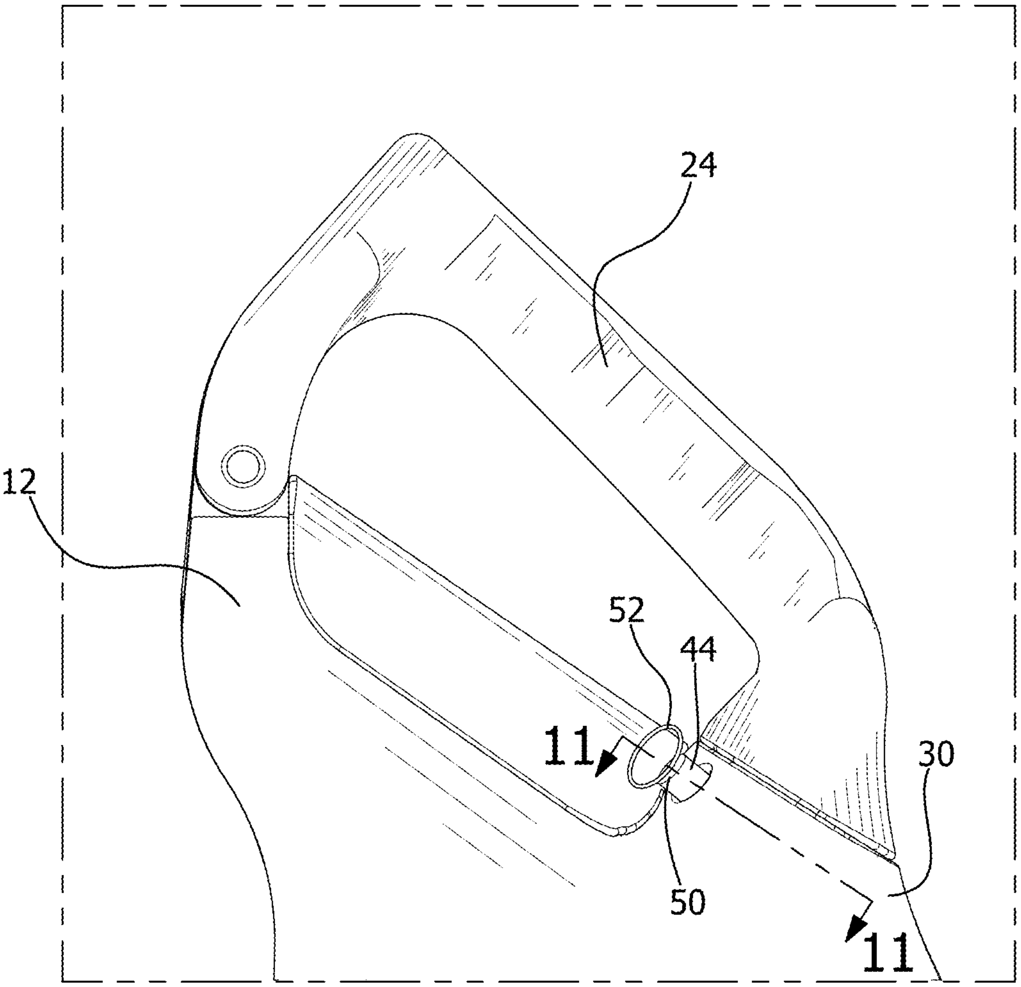
FIG. 10 is a detailed view of an embodiment of the disclosure for the area indicated in FIG. 9.

With reference now to the drawings, and in particular to FIGS. 1 through 14 thereof, a new horse riding handles embodying the principles and concepts of an embodiment of the disclosure and generally designated by the reference numeral 10 will be described.

As best illustrated in FIGS. 1 through 6, the bareback riding handle device 10 generally comprises a base 12 having a bottom surface 14 configured for conforming to a back 16 of a horse 18 adjacent to a base 20 of a neck 22 of the horse 18. A handle 24 has a forward end 26 pivotally coupled to the base 12 such that the handle 24 is pivotable into a closed position 28. A handle receiver 30 is configured for coupling to rigging 32 extending over a portion of the base 12 and strapped onto the horse 18. The handle 24 is selectively engageable to the handle receiver 30 such that the handle 24 is secured in the closed position 28. A release mechanism 34 couples the handle 24 to the handle receiver 30. The release mechanism 34 is operable to release the handle 24 from the handle receiver 30 such that the handle 24 is free to pivot out of the closed position 28.

The handle receiver 30 has a securing wall 36. The securing wall 36 has a securing aperture 38 extending through the securing wall 36. A tongue 40 is coupled to and extends from the handle 24. The tongue 40 is positioned adjacent to the securing wall 36 when the handle 24 is in the closed position 28. The tongue 40 has a securing channel 42 extending into the tongue 40. The securing channel 42 is aligned with the securing aperture 38 when the handle 24 is in the closed position 28. The release mechanism 34 may be a pin 44 extendable through the securing aperture 38 and into the securing channel 42 such that the pin 44 inhibits movement of the tongue 40 relative to the securing wall 36. The securing wall 36 may extend fully around and defining a well 46 in the handle receiver 30. The tongue 40 is positioned in the well 46 such that the well 46 surrounds the tongue 40 when the handle 24 is in the closed position 28. The securing channel 42 may also extend fully through the tongue 40. The pin 44 can then be extended fully through the tongue 40 and into a void 48 in the securing wall 36 opposite the securing aperture 38. The securing channel 42 is angled relative to the handle 24 such that an end 50 of the pin 44 is configured to be accessible to a hand of a rider opposite a hand grasping the handle 24.

Figure 11:
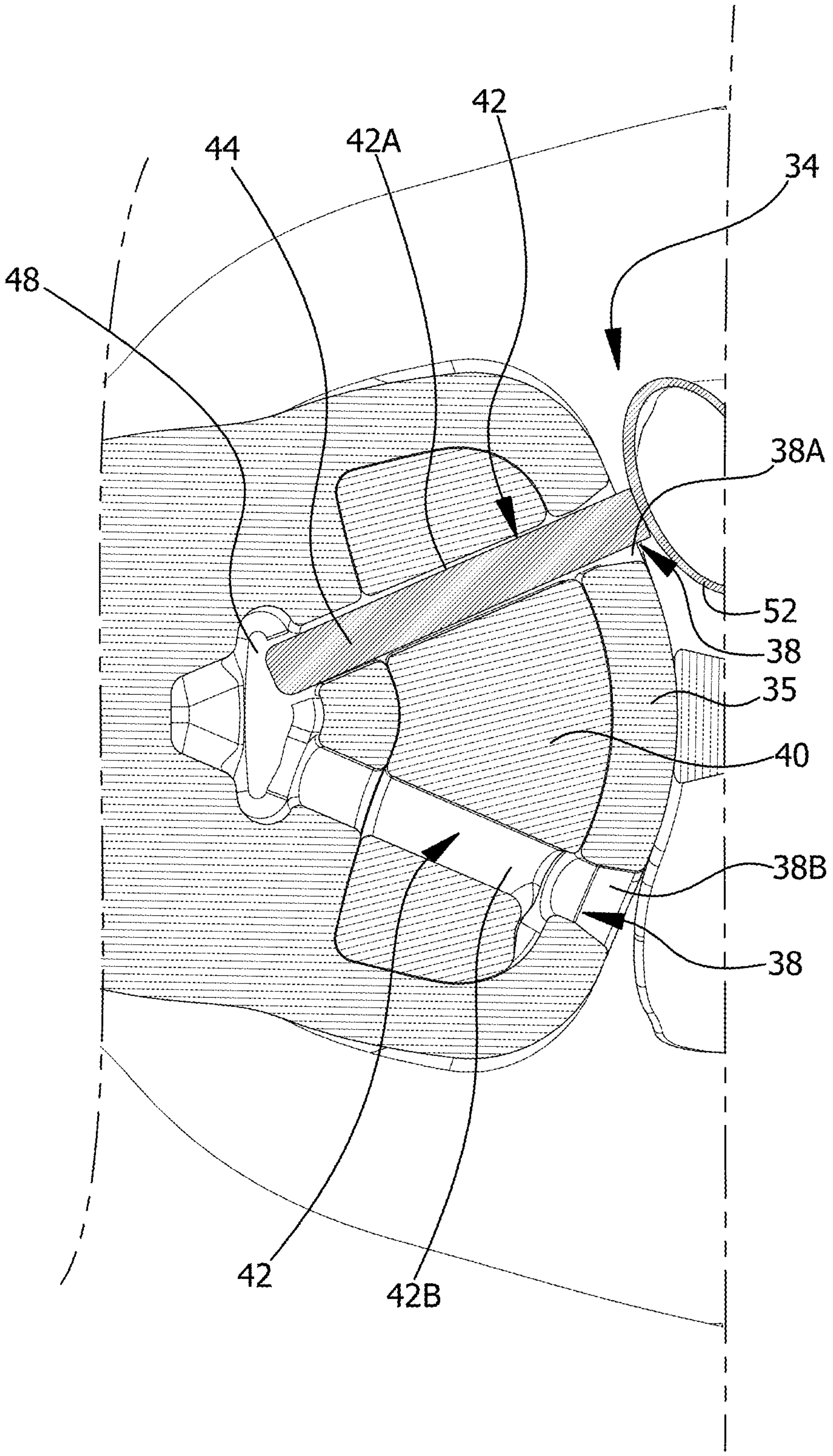
FIG. 11 is a cross-sectional view of an embodiment of the disclosure taken along line 11-11 of FIG. 10.
Figure 12:
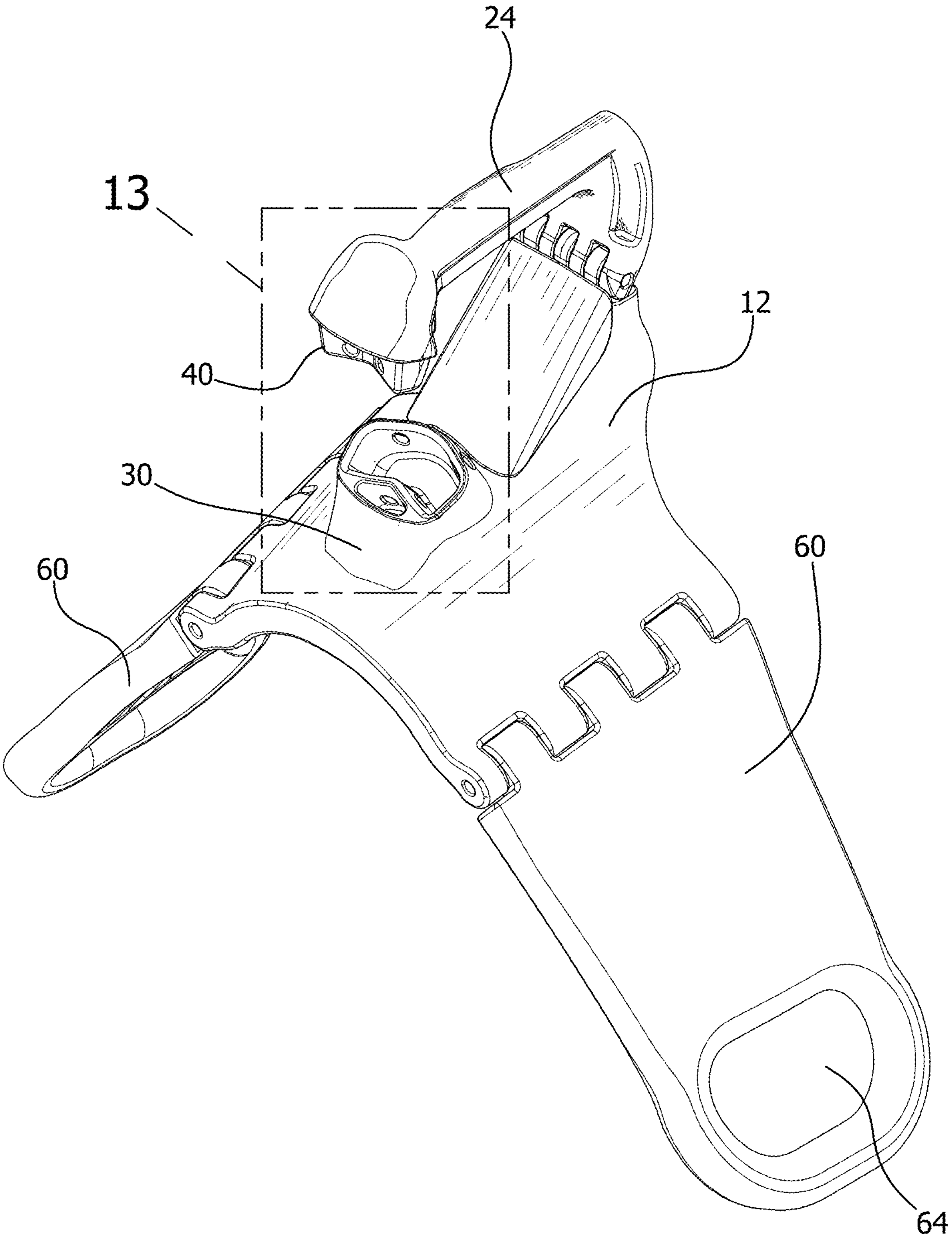
FIG. 12 is a top rear side perspective view of an embodiment of the disclosure.
Figure 13:
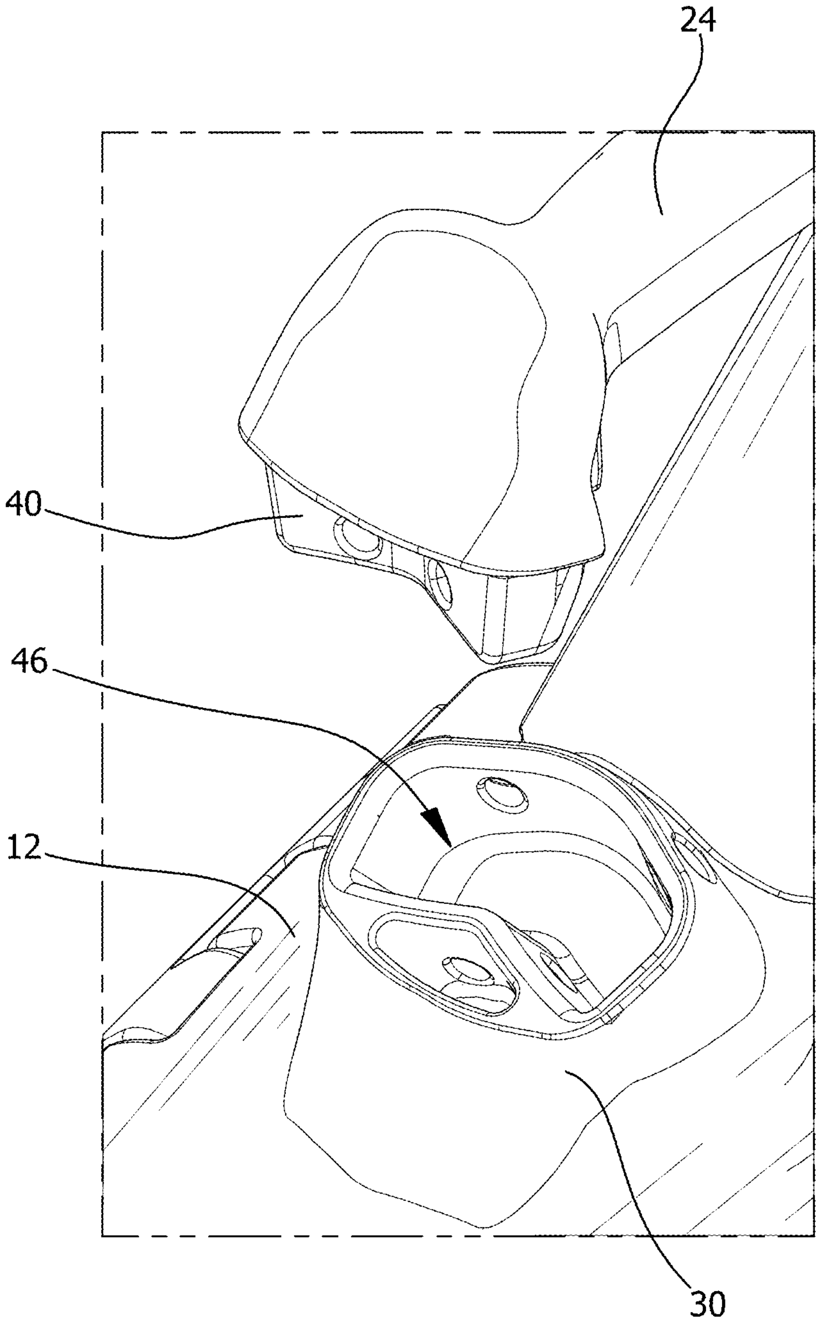
FIG. 13 is a detailed view of an embodiment of the disclosure for the area indicated in FIG. 12.
Figure 14:
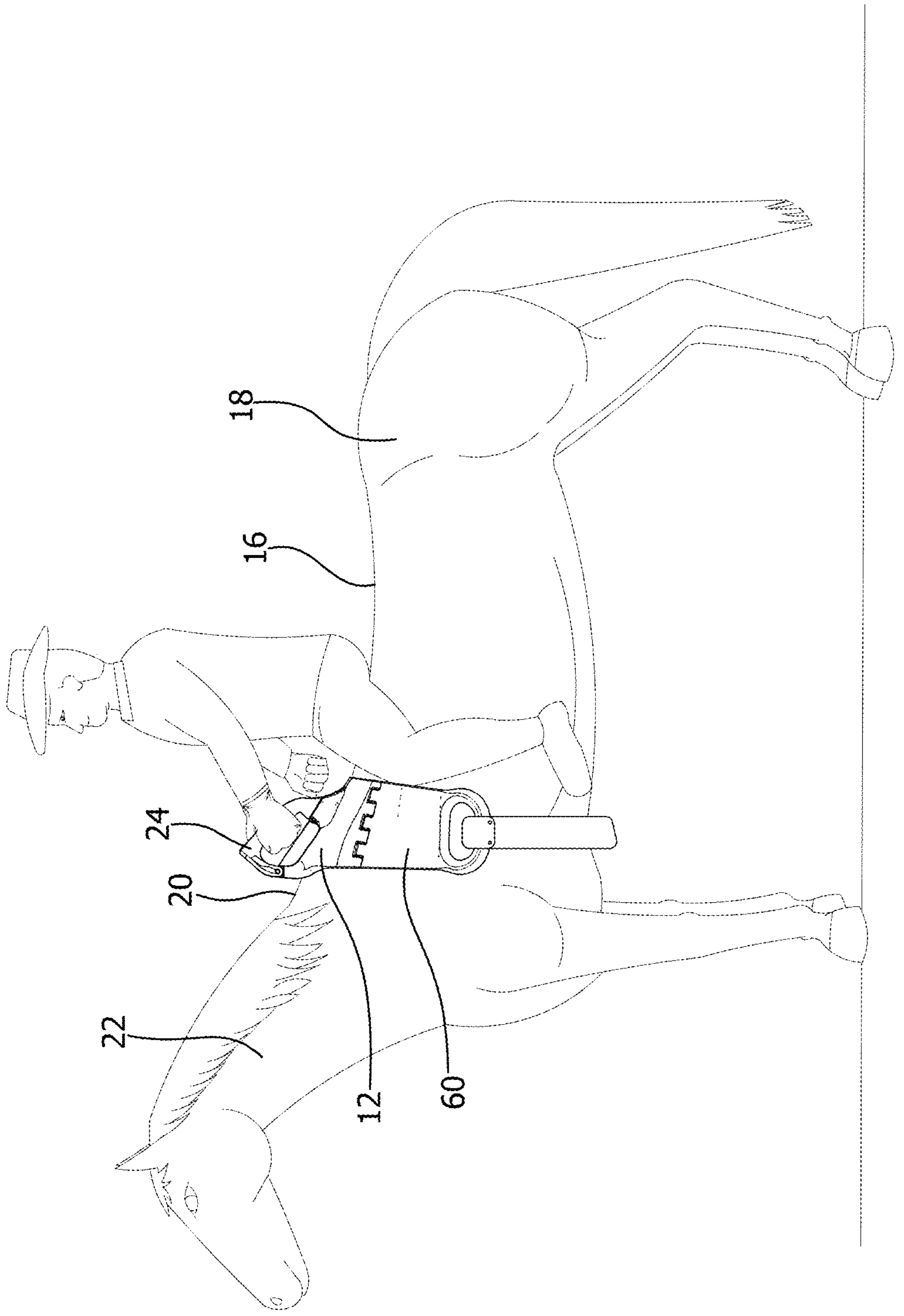
FIG. 14 is a side view of an embodiment of the disclosure in use.

To provide for ambidextrous use, the securing aperture 38 may be a first securing aperture 38A and the securing channel 42 is a first securing channel 42A. A second securing aperture 38B extends through the securing wall 36 and a second securing channel 42B extends through the tongue 40. The second securing channel 42B is angled relative to the first securing channel 42A and the handle 24 such that the end 50 of the pin 44 is configured for being positioned selectively accessible from either side of the handle 24. This is best shown in FIG. 11, which shows an embodiment of the invention. It is noted the drawing figures may show embodiments of the invention but the structures as shown in the embodiments may be equally combined provided the structures or combinations are not mutually exclusive. Thus the two channeled tongue 40 as shown in FIG. 11 is the same as would be present in the embodiment shown in FIGS. 1 through 6. A grip ring 52 is coupled to and extends from the pin 44. The grip ring 52 is an ellipse having a major axis oriented perpendicular to the pin 44 to facilitate quick grasping of the grip ring 52 to pull the pin 44 releasing the handle 24 from the closed position 28.

To provide for pivoting of the handle 24, each of a plurality of base plates 54 is coupled to and extends from the base 12. The base plates 54 are parallel and spaced. The handle 24 has a plurality of handle plates 56 which are parallel and spaced. The handle plates 56 are positionable interleaved with the base plates 54. A handle axle 58 extends through the base plates 54 and the handle plates 56 such that the handle 24 is pivotally engaged to the base 12. This also allows for quick replacement of a broken handle by removal of the handle axle 58, removal of the broken handle, and reattachment of a new handle using the handle axle 58. The handle 24, as well as the base 12 and handle receiver 30 may all be constructed of a durable material through 3D printing to specifications specific to a particular horse, rider, and other structural preferences such that repair and replacement time is minimized.

In an embodiment shown primarily in FIGS. 8 through 14, The handle receiver 30 is integral to the base 12 and additional structure is coupled to the base 12 to provide for rigging coupled to the base 12 as shown in the drawing figures and described below. The base 12 has the bottom surface 14 configured for conforming to the back 16 of the horse 18 adjacent to the base 20 of the neck 22 of the horse 18. The handle 24, handle receiver 30, and release mechanism 34 are structured as described above and shown in FIGS. 1 through 6. However, each of a pair of lateral panels 60 is pivotally coupled to a respective lateral side 62 of the base 12. Each of the lateral panels 60 includes a respective rigging ring 64 wherein the lateral panels 60 are configured for securing the base 12 to the horse 18. The lateral panels 60 may also be attached via a respective axle allowing for replacement of the lateral panels 60 as desired either for repair or to adjust a distance or spacing of the rigging rings 64 from the base 12. The conforming structure of the base 12, i.e. the surface 14, and spacing of the lateral sides 62 allow for greater comfort for the horse 18 and securing of the base 12 without excessive force which can cause injury to the horse 18 as in prior art, such as that shown in FIG. 7. The present invention is unlike prior art which generally provides for a non-customized surface shape that is originally stiff or rigid such that tightening of rigging provides gaps, discomfort, and potential injury to the horse 18 which may even include broken ribs. The known prior art can also adversely influence performance of the horse 18.

In use, the device 10 is strapped onto the horse 18 through extrinsic rigging 32 or the lateral panels 60. The handle 24 is secured into the closed position 28 with the pin 44 positioned on a desired side of the handle 24 to facilitate quick grasping and removal of the pin 44 to allow release of the handle 24 from the handle receiver 30 when needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bareback riding handle device comprising:

a rigid base, said base having a bottom surface configured for conforming to a back of a horse adjacent to a base of a neck of the horse;

a handle, said handle having a forward end being pivotally coupled to said base through a handle axle mounted to the base such that said handle is pivotable about the handle axle into a closed position;

a handle receiver, said handle receiver being configured for coupling to rigging extending over a portion of said base and strapped onto the horse;

wherein said handle is selectively engageable to said handle receiver such that said handle is secured in said closed position; and a release mechanism coupling said handle to said handle receiver, said release mechanism being operable to release said handle from said handle receiver such that said handle is free to pivot about the handle axle out of said closed position.

2. The bareback riding handle device of claim 1, further comprising:

said handle receiver having a securing wall, said securing wall having a securing aperture extending through said securing wall;

a tongue coupled to and extending from said handle, said tongue being positioned adjacent to said securing wall when said handle is in said closed position, said tongue having a securing channel extending into said tongue, said securing channel being aligned with said securing aperture when said handle is in said closed position; and said release mechanism being a pin extendable through said securing aperture and into said securing channel such that said pin inhibits movement of said tongue relative to said securing wall.

3. The bareback riding handle device of claim 2, further comprising said securing wall extending around and defining a well in said handle receiver, said tongue being positioned in said well such that said well surrounds said tongue when said handle is in said closed position.

4. The bareback riding handle device of claim 3, wherein:

said securing channel extends fully through said tongue; and said pin extends fully through said tongue and into a void in said securing wall opposite said securing aperture.

5. The bareback riding handle device of claim 2, further comprising said securing channel being angled relative to said handle such that an end of said pin is configured to be accessible to a hand of a rider opposite a hand grasping said handle.

6. The bareback riding handle device of claim 5, further comprising:

said securing aperture being a first securing aperture, said securing channel being a first securing channel; and a second securing aperture extending through said securing wall; and a second securing channel extending through said tongue, said second securing channel being angled relative to said first securing channel and said handle such that said end of said pin is configured for being positioned selectively accessible from either side of said handle.

7. The bareback riding handle device of claim 2, further comprising a grip ring coupled to and extending from said pin, said grip ring being an ellipse having a major axis oriented perpendicular to said pin.

8. The bareback riding handle device of claim 1, further comprising:

a plurality of base plates coupled to and extending from said base, said base plates being parallel and spaced;

a plurality of handle plates, said handle plates being parallel and spaced, said handle plates being positionable interleaved with said base plates; and the handle axle extending through said base plates and said handle plates wherein said handle is pivotally engaged to said base.

9. A bareback riding handle device comprising:

a rigid base, said base having a bottom surface configured for conforming to a back of a horse adjacent to a base of a neck of the horse;

a handle, said handle having a forward end being pivotally coupled to said base through a handle axle mounted to the base such that said handle is pivotable about the handle axle into a closed position;

a handle receiver, said handle receiver being coupled to said base;

wherein said handle is selectively engageable to said handle receiver such that said handle is secured in said closed position; and a release mechanism coupling said handle to said handle receiver, said release mechanism being operable to release said handle from said handle receiver such that said handle is free to pivot about the handle axle out of said closed position.

10. The bareback riding handle device of claim 9, further comprising:

said handle receiver having a securing wall, said securing wall having a securing aperture extending through said securing wall;

a tongue coupled to and extending from said handle, said tongue being positioned adjacent to said securing wall when said handle is in said closed position, said tongue having a securing channel extending into said tongue, said securing channel being aligned with said securing aperture when said handle is in said closed position; and said release mechanism being a pin extendable through said securing aperture and into said securing channel such that said pin inhibits movement of said tongue relative to said securing wall.

11. The bareback riding handle device of claim 10, further comprising said securing wall extending around and defining a well in said handle receiver, said tongue being positioned in said well such that said well surrounds said tongue when said handle is in said closed position.

12. The bareback riding handle device of claim 11, wherein:

said securing channel extends fully through said tongue; and said pin extends fully through said tongue and into a void in said securing wall opposite said securing aperture.

13. The bareback riding handle device of claim 10, further comprising said securing channel being angled relative to said handle such that an end of said pin is configured to be accessible to a hand of a rider opposite a hand grasping said handle.

14. The bareback riding handle device of claim 13, further comprising:

said securing aperture being a first securing aperture, said securing channel being a first securing channel; and a second securing aperture extending through said securing wall; and a second securing channel extending through said tongue, said second securing channel being angled relative to said first securing channel and said handle such that said end of said pin is configured for being positioned selectively accessible from either side of said handle.

15. The bareback riding handle device of claim 10, further comprising a grip ring coupled to and extending from said pin, said grip ring being an ellipse having a major axis oriented perpendicular to said pin.

16. The bareback riding handle device of claim 9, further comprising:

a plurality of base plates coupled to and extending from said base, said base plates being parallel and spaced;

a plurality of handle plates, said handle plates being parallel and spaced, said handle plates being positionable interleaved with said base plates; and the handle axle extending through said base plates and said handle plates wherein said handle is pivotally engaged to said base.

17. The bareback riding handle device of claim 9, further comprising a pair of lateral panels, each of said lateral panels being pivotally coupled to a respective lateral side of said base, each of said lateral panels including a respective rigging ring wherein said lateral panels are configured for securing said base to the horse.

18. The bareback riding handle device of claim 9, further comprising said handle receiver being an integral extension of said base.

* * * * *